Nov. 10, 1959    L. A. WEISS ET AL    2,911,829
TOTALIZER SYSTEM
Filed Feb. 18, 1953    4 Sheets-Sheet 1

INVENTORS
Leo A. Weiss
Robert J. Levine
BY  Leonard H. King
AGENT.

Nov. 10, 1959   L. A. WEISS ET AL   2,911,829
TOTALIZER SYSTEM
Filed Feb. 18, 1953   4 Sheets-Sheet 4

INVENTORS
Leo A. Weiss
Robert J. Levine
BY Leonard H. King
AGENT.

2,911,829

Patented Nov. 10, 1959

2,911,829

TOTALIZER SYSTEM

Leo A. Weiss, Elmhurst, and Robert J. Levine, New York, N.Y., assignors, by mesne assignments, to Avien, Inc., Woodside, N.Y., a corporation of New York Application February 18, 1953, Serial No. 337,478

9 Claims. (Cl. 73—304)

This invention relates to improvements in measuring apparatus used for the remote measuring of the quantity of fuel in the tanks of aircraft. In particular, this invention is directed to a totalizing system wherein a single remotely located indicator can optionally show with accuracy the quantity of fuel in a plurality of tanks or in a selected tank.

In present day aircraft, fuel is stored in several tanks, usually located fore and aft and in the wings of the aircraft, and often in detachable externally mounted "drop" tanks. For purposes of fuel programming and center of gravity control, it is desirable that the pilot or flight engineer have accurate knowledge of the distribution of fuel among the several tanks, as well as knowledge of the total fuel aboard.

An accurate fuel gage measuring system in aircraft is of important military value; in operational use, aircraft, particularly fighter types, are frequently lost in action because the pilot does not have sufficient fuel to return to his base. An accurate fuel gaging system will enable the pilot to engage in maximum combat activity and yet alert him to return to his base before his supply of fuel is exhausted.

In many applications, particularly fighter type aircraft, space and weight limitations make it highly desirable that but one complete gaging system be employed which is capable of indicating, at the pilot's option, the quantity of fuel in an individual tank, or the total fuel distributed throughout the various tanks. In particular, this invention relates to capacitor type measuring apparatus where a liquid having a dielectric constant differing from that of air is made the dielectric of a condenser. The displacement of the liquid by air results in a change of capacitance, thus providing a measure of liquid level.

In general, such a system utilizes a capacitor formed of parallel or concentric plates, extending from top to bottom of the fuel tank. The plates of the capacitor are connected into a modified Wheatstone bridge as one arm of the bridge. Whereas a variety of bridge balancing methods may be employed, the balancing arm is often a variable potentiometer which is operated in conjunction with an indicating means as is more fully disclosed later. If each tank of a multiple tank installation contains a sensing capacitor, by connecting the sensing capacitors in parallel, the bridge will measure the total capacitance of the various sensing units. This capacitance will be a measure of the total quantity of fuel.

It is found in actual practice that after a system has been "trimmed" accurately to indicate the total quantity of fuel in a plurality of tanks, the measurement of fuel in a particular tank is difficult to perform accurately.

Part of such difficulty arises from the manner of such measurement which involves the elimination of the sensing units other than that whose information is to be detected, and substituting capacitors simulating the "empty capacitances" of the eliminated sensing capacitors. By "empty capacitance" is meant the normal air capacitance of a sensing capacitor inserted in an empty tank. The introduction of the necessary relays and capacity simulating circuits introduces many sources of error in a sensitive measuring apparatus of the capacitive type.

This invention provides an improved apparatus of the type described and permits the use of relatively inexpensive standard commercial components without detrimental effects to the system.

It is an object of this invention to provide a new and improved system for indicating the total quantity of liquid in a plurality of containers. It is another object of this invention to provide a highly accurate system for indicating the total quantity of liquid in a plurality of containers on a single indicator. It is still another object of this invention to provide a new and improved system for indicating the quantity of liquid in a selected one of a plurality of containers. A particular object of this invention is to provide a system for measuring fuel in a plurality of tanks aboard an aircraft wherein removable tanks are used.

Various other objects, advantages, and features of novelty will become more apparent from the following description of a preferred embodiment thereof, taken with reference to the accompanying drawings wherein:

Fig. 1 presents in a combined pictorial and schematic drawing a basic capacitance gage circuit.

Figure 6:
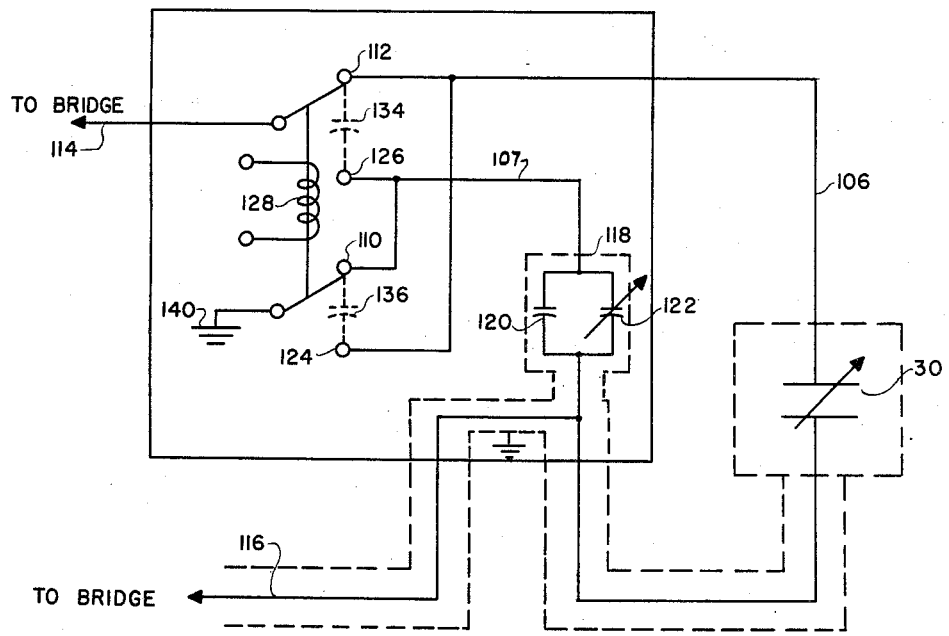

Fig. 6 presents diagrammatically a preferred embodiment of a switching circuit forming part of the system of this invention.

Figure 7:
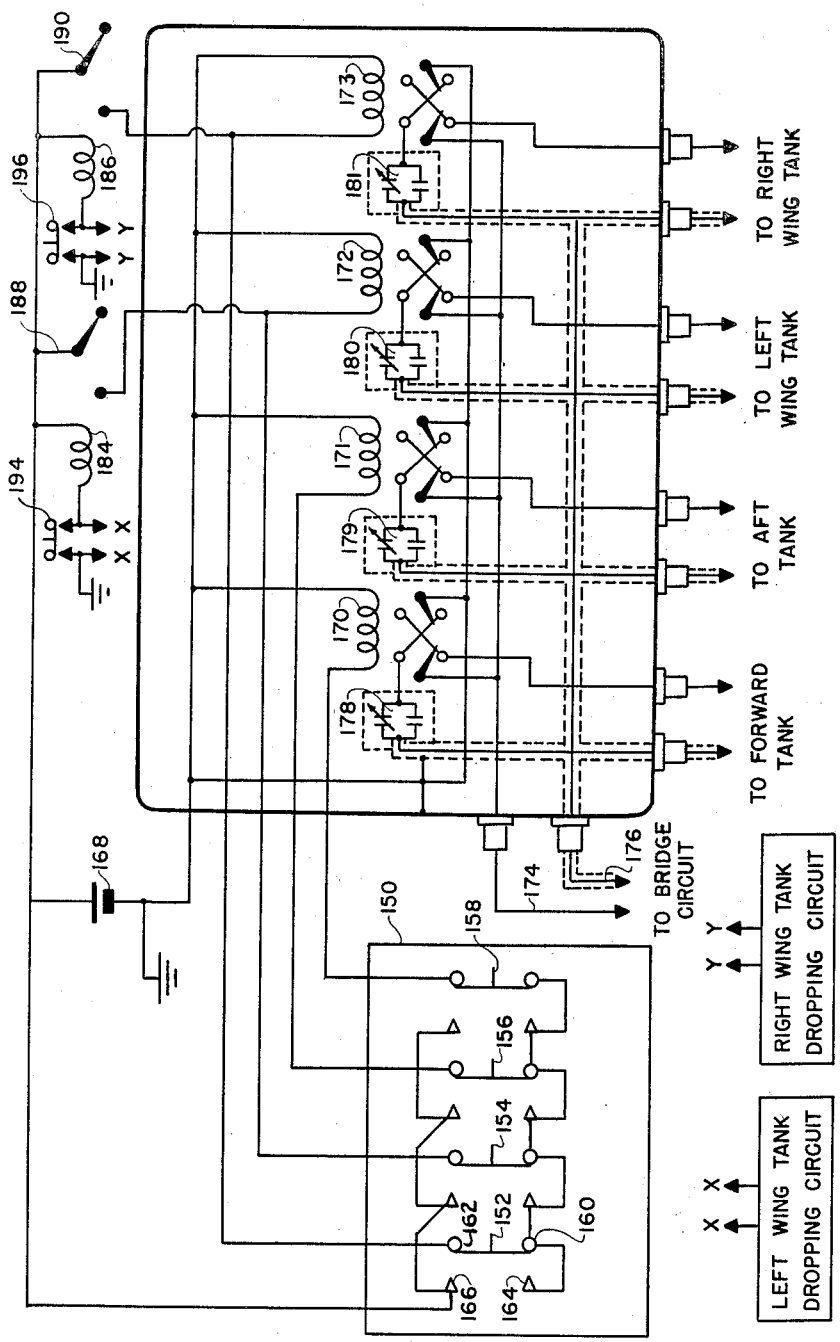

Fig. 7 is a circuit dagram of a control and switching system of this invention.

In the figures, like members refer to like elements.

The capacitance of capacitor 1, which is dependent upon the electrode area A; the distance, $d$, separating the two electrodes 2 and 3 and, $k$, the dielectric constant of the material between them, is fixed in the case of a sensing capacitor by the rigid mounting of the plates. Therefore, the only variable is the dielectric material between the plates.

The dielectric constant of air is approximately 1, while that of fuel is approximately 2. Because of this ratio of approximately 2:1, the completely immersed unit will have approximately twice the capacitance of the same unit when dry. It is important to remember that tank unit capacitance in an empty tank is not zero, but rather the air capacitance of the unit. Thus, a tank unit having an air capacitance of 100 mmf. will have "full tank" capacitance of approximately 200 mmf. with intermediate capacitance values proportional to fuel level.

The sensing capacitor is preferably formed of concentric tubes mounted in the fuel tank of the aircraft and extending substantially the depth of the tank. The capacitor is provided with concentric inner and middle cylinders, which form the two electrodes of the capacitor, while an outer cylinder serves both as an electrical shield and a mechanical support for the unit. Vent holes are so located that fuel will flow freely through the tank unit insuring that the level of fuel in the unit is exactly the same as in the tank.

Figure 1:
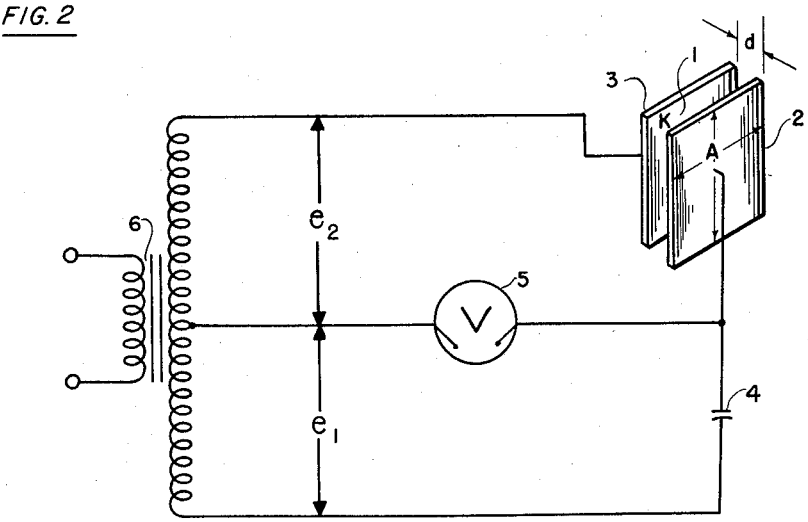

The simple circuit of Fig. 1 shows a capacitance bridge employing a voltmeter to indicate unbalance. Capacitor 1 is the sensing unit. Capacitance 4 is a fixed reference capacitor. The bridge is in balance when equation:

$$C_1 e_1 = C_2 e_2$$

is satisfied. In this condition the voltmeter 5 will read zero voltage.

$C_1$ is the fixed reference capacitor 4. $C_2$ is the capacity of the variable capacitor which is, in this case, the sensing capacitor, and $e_1$ and $e_2$ are the voltages in each side of the bridge, respectively, as provided by transformer 6. As will be later described in more detail, the unbalance voltage applied to the voltmeter can instead be used to operate a motor-driven mechanism as part of an automatic rebalancing circuit which will keep the bridge constantly balanced and, at the same time, provide an indication of the capacity of the sensing capacitor.

Figure 2:
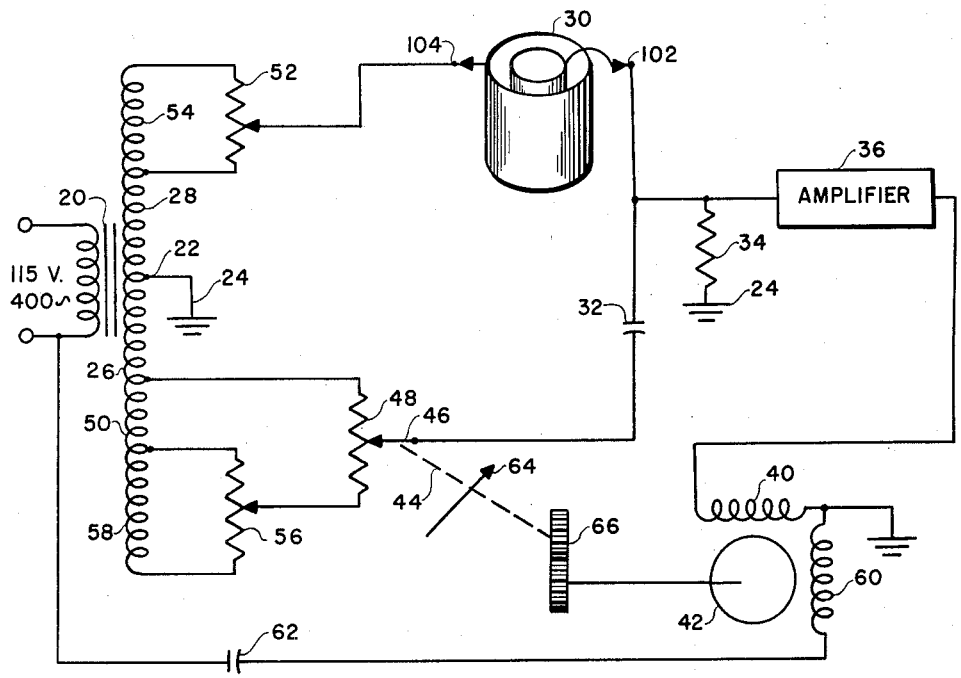
Fig. 2 is a combined pictorial and schematic presentation of a practical capacitive type measuring apparatus.

A preferred circuit is disclosed in Fig. 2 wherein transformer 20 is used to transform a 115 volt-400 cycle alternating current from the aircraft supply to the required voltage. The secondary of this transformer is tapped at 22 which is connected to ground 24, thus providing portions 26 and 28, each of which serves as an arm of a modified Wheatstone bridge. A tank sensing capacitor 30 forms a third arm and a reference capacitor 32 the fourth arm. The junction of the tank sensing unit 30 and the reference capacitor 32 are connected in common to the input of an amplifier 36, shown as a grid resistor 34, which is returned through ground 24 to the transformer tap 22. Variations in the capacitance of sensing unit 30 due to variation in the level of the fuel result in an unbalance current flowing through grid resistor 34 resulting in a signal voltage being applied to amplifier 36 where it is amplified and in turn applied to one phase winding 40 of two phase motor 42, so that an output current from the amplifier 36 will drive motor 42 so as to cause shaft 44 to move the variable position arm 46 of potentiometer 48. Potentiometer 48 is connected across a portion 50 of transformer secondary 26, thus in effect, varying the position of arm 46 varies the voltage applied to the portion of the bridge circuit containing the reference capacitor 32. Motor 42 will continue to operate, moving variable arm 46 until the bridge has reached its null condition, at which time the current through the grid resistor 34 is zero. In practice, two additional potentiometers for empty and full adjustment are provided. Potentiometer 52 is connected across a portion 54 of transformer secondary 28 and provides a means for adjusting the indicator pointer to zero on the scale when the tank is empty, and potentiometer 56 is connected in a similar fashion across a portion 58 of secondary 26 so as to provide a means of adjusting the scale reading so that a full indication reading is obtained on the indicator when the tank is filled to capacity. Current of the proper phase is obtained for the other phase winding 60 of the motor 42 by means of a connection to the primary of transformer 20 through a phase shifting capacitor 62. An indicator pointer 64 is coupled to potentiometer 48 by means of common shaft 44. Motor 42 is connected to the shaft 44 driving the variable contact arm 46 and indicator pointer 64 by an approximately 12,000:1 ratio gear train. A second potentiometer may be coupled to the shaft to provide a variable voltage related to the quantity of fuel in a particular tank under measurement. This voltage may be added to voltages derived in a similar manner from other tank quantity systems, the total reading being fed to a totalizer indicator operated by a self-balancing voltage bridge.

With a complete system of this type, the pilot or flight engineer need only scan the indicators before him to obtain an indication of where the fuel is located and the total quantity of such fuel.

As pointed out earlier, in many installations instrument panel space and/or weight limitations make it impractical to provide so complete an installation. Under such conditions, a selector switch system may be provided which will permit the functions of indication of individual tank fuel quantity or, at the pilot's option, the total quantity of fuel, on the same indicator. In such a system, the sensing units 72, 74 and 76, located in the individual tanks 78, 80 and 82, are connected in parallel with each other in the bridge circuit 84. This is shown in Fig. 3.

Figure 3:
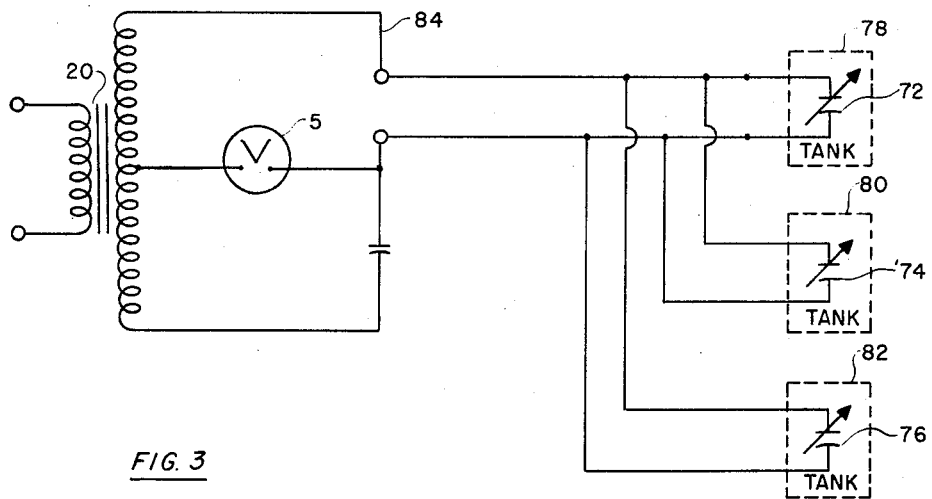
Fig. 3 is a diagram showing the basic elements of a system for measuring capacitively the contents of a plurality of containers.
Figure 4:
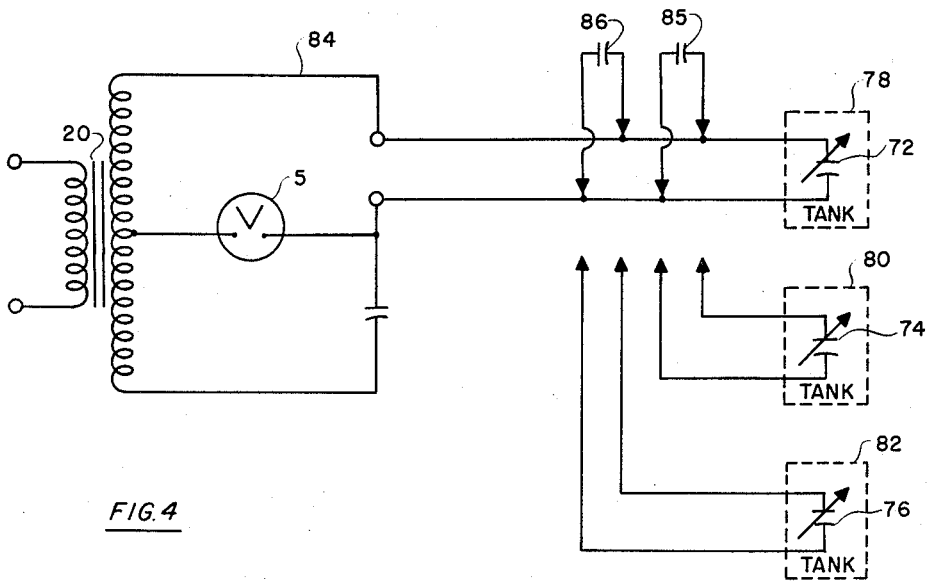
Fig. 4 is a diagram showing the basic elements of a system for measuring capacitively the contents of one of a plurality of containers incorporated in one system.

In this invention, instead of the sensing unit leads going directly to the bridge unit 84 as shown in Fig. 3, means are provided for them to be connected to a unit which I prefer to call a simulator. The function of the simulator may be readily understood if it is remembered that the empty tank capacitance of the sensing unit is not zero mmf. but rather its air capacitance. Suppose that only the fuel in tank 78 is of interest. Then, what must be done is to artificially empty tanks 80 and 82 so that only the fuel in 78 effects the balance of the gage. This may be done manually by physically disconnecting the leads from the sensing units located in tanks 80 and 82 and connecting in their place capacitors 85 and 86, whose capacitance values are equivalent to the respective value of the sensing unit capacitance when located in an empty tank.

The indicator will now read only the fuel in tank 78. To observe fuel quantity of tank 80, it is only necessary to repeat the operation, substituting fixed capacitances for the sensing units in 78 and 82 in the same fashion.

Since it is obviously impractical to plug tank units in and out during flight, the simulator unit is employed to do this job automatically. As the pilot depresses a button on his control panel to select a circuit for reading the tank capacity he is interested in, a relay unit located in the simulator will switch the undesired sensing units from the bridge circuit and, at the same time, connect a fixed capacitance representing the appropriate respective empty tank sensing unit capacitance.

In the case of aircraft using removable fuel tanks containing sensing units, it is necessary to replace these units when they are removed with an equivalent sensing unit air capacitance. This is accomplished by a unit which, at the moment the tank unit is removed, substitutes in the fuel gage circuit a fixed capacitor which simulates the capacitance of a sensing unit in an empty tank. That this capacitance is not zero but the air capacitance of the unit has been earlier pointed out.

While it need not be considered in this discussion, it should be appreciated that in many installations a particular tank will contain several sensing units connected in parallel so as to compensate for various attitudes of the aircraft in flight.

Figure 5:
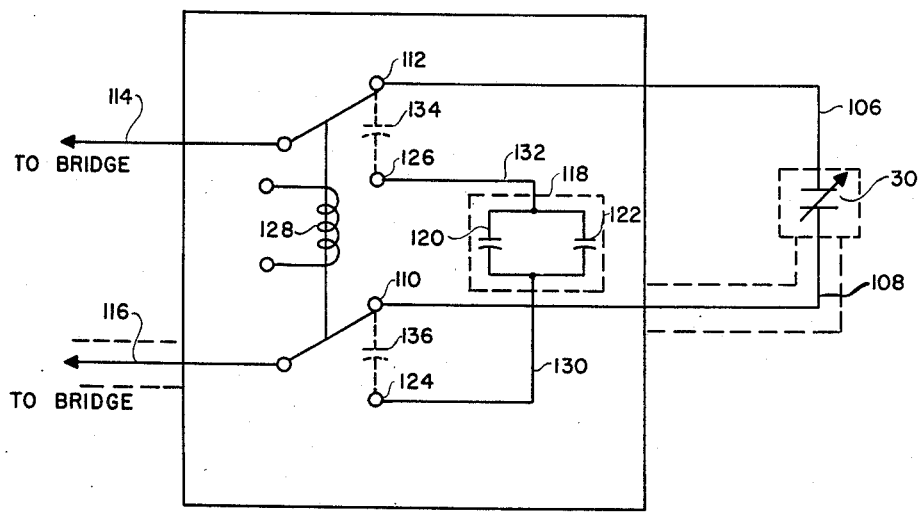
Fig. 5 shows diagrammatically a conventional switching circuit.

In Fig. 5 there is shown a simple circuit for substituting a fixed capacitor for the residual capacitance of the sensing unit under empty tank conditions.

In the position shown, sensing capacitor 30 is connected to the bridge circuit of Fig. 2 at points 102 and 104 through a circuit including leads 106 and shielded lead 108, the relay contacts 110 and 112, and leads 114 and shielded lead 116. Substitute capacitance 118 consisting of mica capacitor 120 and variable ceramic trimmer capacitor 122 is connected to contacts 124 and 126 of relay 128 by means of leads 130 and 132. Stray capacitance, such as wiring capacitance between the leads, is shown dotted as an equivalent lumped constant capacitors 134 and 136. Consideration of this circuit will make clear that the substitute capacitance is never completely out of the circuit as the stray capacitance serves as coupling capacitors 134 and 136 to connect capacitance 118 into the circuit in parallel with the sensing capacitors 30. Conversely, when sensing capacitor 30 is disconnected by operation of relay 128 to the alternate position and the substitute capacitor 118 is directly connected to the bridge, the same stray capacitances 134 and 136 serve to couple the sensing capacitor 30 into the circuit.

The effect of stray capacitance can be greatly reduced by careful equipment design, which in general requires the liberal use of space, a luxury which cannot be indulged in for equipment intended for aircraft use. An electrically suitable relay of low stray capacitance is usually heavy, cumbersome, and disproportionately expensive, costing perhaps several hundred times as much as the simple relays which this invention employs.

As used herein, the terms "high and low impedance leads" are used with reference to the point to which the lead is normally connected in the bridge circuit. A high impedance point being, for example, the junction between sensing capacitor 30 and fixed capacitor 32. This junction has relatively high impedance to ground, being of the order of 250,000 ohms. The junction between the transformer 28 and the sensing capacitor 30 is a low impedance point as normally only about 2000 ohms of impedance appears between that point and ground.

In the preferred embodiment of this invention as shown in Fig. 6 the effect of stray capacitance is eliminated as follows: Only the low impedance lead 106 connected to the sensing unit and lead 107 connected to the substitute capacitance will be switched, the high impedance lead 116 being permanently connected into the circuit. Double-pole double-throw relay 128 is so connected that either contact 110 or contact 124 is connected to ground 140 so that the capacitance which is switched out of the system will be shunted to ground.

In Fig. 6 the sensing unit 30 is shown switched into the bridge circuit. It will be noted that the substitute capacitance 118 appears between the high impedance lead 116 and ground (i.e., in parallel with grid resistor 34 across the input to the amplifier 36), and does not appear in the measuring circuit. The stray capacitance shown as equivalent capacitors 134 and 136 appear between the low impedance lead 106 and ground 140 (i.e., across the low impedance winding 28 of the bridge transformer 20), and again is not in the measuring circuit. The only capacitance which the bridge measuring circuit sees is the desired sensing unit capacitance 30. Again when the substitute capacitance 118 is switched into the measuring system, the sensing unit capacitance 30 appears between the high impedance lead 116 and ground 140 and the stray capacitance shown as capacitors 134 and 136 appears between the low impedance lead and ground. Thus, the only capacitance which the bridge measuring circuit sees is the desired substitute capacitance 118. This is true even if the sensing unit is removed from the circuit, as would occur in the dropping of an external tank. It is to be noted that low cost, light weight relays of standard design may be used in this circuit.

In a particular circuit application it may be preferable to switch the high impedance leads and keep the low impedance leads fixed. In this case the unused capacitance will appear in parallel with the relatively low impedance transformer secondary and thus will not be measured by the bridge circuit.

A typical aircraft installation utilizing four separate fuel tanks is shown in Fig. 7. Control box 150, which may be located on the pilot's instrument panel contains four switches 152, 154, 156 and 158; a separate switch being provided for each tank in the system. By depressing push button switch 152, shown as the button for reading the fuel quantity for the right wing tank, the circuit leading to the relay connected to the sensing unit in the right wing tank is broken between contacts 160 and 162. In turn, connection is made between contacts 164 and 166, thus completing a circuit which includes voltage source 168, relays 170, 171 and 172. Cable 174 and shielded cable 176 now have connected across them the right wing tank sensing unit and substitute capacitors 178, 179 and 180. If the pilot is desirous of determining the quantity of fuel in another tank, he need only press the appropriate button for that tank and, in a similar fashion, the sensing units of the undesired tanks are replaced in the circuit by their equivalent air capacitance.

Assuming that the wing tanks are of the removable type, dropping of the tanks would result in normally de-energized relays 184 and 186 being energized so that switch 188 and 190, respectively, are connected to voltage source 168; thus energizing relays 172 and 173 which then substitutes the equivalent air capacitance of the sensing units, capacitor 180 and 181, for the removable tank sensing units. Switches 194 and 196 serve to actuate the tank dropping circuit as well as relays 184 and 186.

Thus, depressing switch 158 will result in relay 171 substituting capacitance 179 for its respective sensing unit. Relays 172 and 173, which normally would be effected by operation of the button 158, are not activated since they are already in the simulator position.

It is to be understood that in some circuits relays 184 and 186 are of the normally energized variety.

What is claimed is:

1. In a liquid level sensing apparatus provided with a bridge circuit having a capacitive arm connected between a point of low impedance and a point of high impedance with respect to a low potential point, a sensing capacitor having two terminals for connection in said arm, said sensing capacitor being positioned in operative relation to a liquid whose level is to be sensed and adapted to vary in capacitance in accordance with the level of said liquid, and a substitute capacitor having two terminals for connection in said arm one of said capacitor terminals being connected at all times to said high impedance point; means for alternatively connecting a selected one of said capacitors in said arm, and means for substantially eliminating the effect of stray capacitance between the unselected capacitor and the bridge circuit comprising means for connecting said unselected capacitor terminal to a low potential portion of the bridge circuit.

2. In a liquid level sensing apparatus provided with a bridge circuit having a capacitive arm connected between a point of low impedance and a point of high impedance with respect to a low potential point, a sensing capacitor having two terminals for connection in said arm, said sensing capacitor being positioned in operative relation to a liquid whose level is to be sensed and adapted to vary in capacitance in accordance with the level of said liquid, and a substitute capacitor having two terminals for connection in said arm one of said capacitor terminals being connected at all times to said high impedance point; means for alternatively connecting a selected one of said capacitors in said arm, and means for substantially eliminating the effect of stray capacitance between the unselected capacitor and the bridge circuit, said connecting means comprising relay means having a first set of contacts operable to connect the other terminal of the selected capacitor operatively in said arm and a second set of contacts operable concomitantly therewith and in circuit with said eliminating means to connect the other terminal of the unselected capacitor to a low potential point of the bridge circuit.

3. In a system for measuring fuel in a plurality of tanks provided in an aircraft wherein one of said tanks is automatically removable from the aircraft and said system utilizes a bridge circuit having a capacitive arm, each tank being provided with a sensing capacitor; a substitute capacitor for each tank mounted independently thereof, each of said capacitors having a first and second terminal, means electrically connecting said first terminals to said capacitive arm of said bridge circuit, means for connecting a selected number of said second terminals to said capacitive arm of said bridge circuit and the balance of said second terminals to a low potential portion of said bridge circuit, and means operable automatically upon removal of said one tank to connect the second terminal of the substitute capacitor thereof to said capacitive arm of said bridge circuit.

4. In a capacitive type measuring apparatus for sensing the level of liquid in a plurality of containers utilizing at least one sensing capacitor in each of said containers, said sensing capacitors being provided with a first and a second terminal and adapted to vary in capacitance in accordance with variations in the level of the liquid, and a bridge circuit having said sensing capacitors connected in parallel between points of high and low impedance with respect to a low potential point of said circuit, the combination of a plurality of substitute capacitors having a first and a second terminal, means for electrically connecting said first terminals of said sensing and substitute capacitors to said high impedance point and means for selectively connecting a selected number of said second terminals to said low impedance point of said bridge circuit and the balance of said second terminals to a low potential point of said bridge circuit.

5. The apparatus of claim 4 wherein said selectively connecting means comprises a plurality of electrically actuated relays.

6. The apparatus of claim 5 wherein there is provided a remotely located switching means for energizing with electric current, said electrically actuated relays.

7. The apparatus of claim 5 wherein there is provided remotely located switching means for energizing, with electric current, a selected group of said electrically actuated relays.

8. The apparatus of claim 4 wherein said means connecting said first terminals to said point of high impedance are electrically shielded by an electrically conductive shield connected to a low potential point of said circuit.

9. In an apparatus utilizing a bridge circuit having a capacitance arm connected between points of high and low impedance with respect to a low potential point for sensing the level of a liquid in a separable tank, the combination of: a sensing capacitor having a first and second terminal, said sensing capacitor being positioned in said tank in operative relationship to said liquid and adapted to vary in capacitance in accordance with the level of said liquid; a substitute capacitor having a first and a second terminal; means to connect said first terminal of said sensing capacitor and said first terminal of said substitute capacitor to said high impedance point; means connecting said second terminal of said sensing capacitor to said low impedance point to form said bridge circuit capacitive arm; means connecting said second terminal of said substitute capacitor to a low potential point of said bridge circuit; means to disconnect said sensing capacitor from said bridge circuit; and an electrically actuated relay for disconnecting said second terminal of said substitute capacitor from said low potential point and connecting said second terminal of said substitute capacitor to said low impedance point of said bridge circuit to form said bridge circuit capacitive arm.

References Cited in the file of this patent
UNITED STATES PATENTS

| | | |
|---|---|---|
| 2,188,628 | Freystedt | Jan. 30, 1940 |
| 2,519,668 | Konigsberg | Aug. 22, 1950 |
| 2,652,534 | Graham | Sept. 15, 1953 |

OTHER REFERENCES

Solarz: Aero Digest, vol. 65, No. 3, September 1952, pages 40, 41, 42, 44, 46, 48, 50, 52, 54, 55, 56.